(12) United States Patent
Jovanovic et al.

(10) Patent No.: US 9,521,599 B2
(45) Date of Patent: Dec. 13, 2016

(54) DYNAMIC TRANSPORT CHANNEL SYNCHRONIZATION

(71) Applicant: Telefonaktiebolaget LM Ericsson (publ), Stockholm (SE)

(72) Inventors: Aleksandar Jovanovic, Solna (SE); Johan Magnusson, Stockholm (SE); Fredrik Sonnevi, Hagersten (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/440,017

(22) PCT Filed: Oct. 31, 2012

(86) PCT No.: PCT/SE2012/051185
§ 371 (c)(1),
(2) Date: Apr. 30, 2015

(87) PCT Pub. No.: WO2014/070053
PCT Pub. Date: May 8, 2014

(65) Prior Publication Data
US 2015/0282023 A1 Oct. 1, 2015

(51) Int. Cl.
*H04W 4/00* (2009.01)
*H04W 36/02* (2009.01)
(Continued)

(52) U.S. Cl.
CPC ......... *H04W 36/02* (2013.01); *H04W 56/0045* (2013.01); *H04W 92/12* (2013.01)

(58) Field of Classification Search
CPC .................................................. H04W 36/02
See application file for complete search history.

(56) References Cited

U.S. PATENT DOCUMENTS

| 2004/0057543 A1* | 3/2004 | Huijgen ............... H04J 3/0682 375/356 |
| 2005/0025194 A1* | 2/2005 | Adjakple .......... H04W 56/0015 370/516 |
| 2006/0029031 A1 | 2/2006 | Koorapaty |

FOREIGN PATENT DOCUMENTS

| EP | 2180618 A2 | 4/2010 |
| EP | 2192816 A1 | 6/2010 |

(Continued)

OTHER PUBLICATIONS

Communication pursuant to Article 94(3) EPC, EP Application No. 12887471.6, dated Oct. 21, 2015, 5 pages.
(Continued)

*Primary Examiner* — Chi H Pham
*Assistant Examiner* — Fahmida Chowdhury
(74) *Attorney, Agent, or Firm* — NDWE LLP (57) ABSTRACT

The present invention relates to a method of, and device in the form of a radio access network supervising entity for, adapting to delay in a communication link established between the radio access network supervising entity and at least one radio base station communicating with a mobile terminal. The method comprises associating a target Connection Frame Number (CFN) to each transmitted data frame, said target CFN being calculated by offsetting an expected CFN with a counter value corresponding to a current communication link delay, repeatedly determining delay of the communication link, and adapting to the delay of the communication link by adjusting transmission time of the transmitted frame, and/or adjusting the target CFN of the transmitted frame, said target CFN being calculated by offsetting the expected CFN with a counter value corresponding to a determined new delay.

16 Claims, 5 Drawing Sheets

(51) Int. Cl.
*H04W 56/00* (2009.01)
*H04W 92/12* (2009.01)

(56) References Cited

FOREIGN PATENT DOCUMENTS

| WO | 0028744 A2 | 5/2000 |
|----|------------|--------|
| WO | 2005004337 A2 | 1/2005 |

OTHER PUBLICATIONS

PCT International Search Report for Counterpart PCT Application No. PCT/SE2012/051185, (Dec. 19, 2013), 4 pages.
PCT Written Opinion of the International Searching Authority for Counterpart PCT Application No. PCT/SE2012/051185, (Dec. 19, 2013), 10 pages.
3GPP TS 25.402 V10.1.0, "Synchronisation in UTRAN Stage 2," ETSI TS 125 402 V10.1.0, Universal Mobile Telecommunications System (UMTS), (Release 10), (Jul. 2011), 53 pages.
3GPP TS 25.427 V11.0.0, "UTRAN Iub/Iur interface user plane protocol for DCH data streams," 3rd Generation Partnership Project, Technical Specification Group Radio Access Network (Release 11), (Dec. 2011), 48 pages.
Landstrom, et al., "Heterogeneous networks — increasing cellular capacity," Ericsson Review, (2011), 6 pages.
International Preliminary Report on Patentability, Application No. PCT/SE2012/051185, dated May 5, 2015, 11 pages.
Supplementary European Search Report, EP Application No. 12887471.6, dated Oct. 1, 2015, 3 pages.

* cited by examiner

DYNAMIC TRANSPORT CHANNEL SYNCHRONIZATION

CROSS-REFERENCE TO RELATED APPLICATIONS

This application is a National stage of International Application No. PCT/SE2012/051185, filed Oct. 31, 2012, which is hereby incorporated by reference.

TECHNICAL FIELD

The invention relates to a method of and device for, adapting to delay in one or more communication links.

BACKGROUND

The ever increasing amount of mobile data traffic in mobile communication networks raises requirements on the infrastructure of the networks. In order to handle the traffic increase, radio cells are becoming smaller and smaller as a complement to existing macro networks (e.g. covering hotspots such as cafes and stores)

Radio access network (RAN) transport, i.e. communication between Node B and radio network controller (RNC), is becoming a bottleneck due to the high cost of providing connectivity with high quality transport. Under these conditions, operators seek to connect the Node B's using a wide variety of transport technologies (such as Asymmetric Digital Subscriber Line (ADSL)) with varying characteristics in terms of e.g. delay.

As a mobile terminal traverses between the cells, soft handovers occur on a per second basis in a city environment, i.e. communicates simultaneously with a plurality of Node B's having different transport characteristics. Under these circumstances, it is important to continuously aim for optimal performance and thus decrease roundtrip time in order to improve speech perception and throughput.

In order to provide data transmission with uniform rate over radio interface and to core network, data need to be buffered in the RAN nodes, e.g. in the RNC is case of uplink communication and in the Node B's in case of downlink communication. In case of communication links with large delay difference, data have to be buffered for the link with the shorter delay to take into account the delay of the communication link having the greatest delay.

Thus, reception window size and position must to be selected with respect to expected data frame delays and delay variations on the micro-diversity legs.

In case of transport with varying delay characteristics, the size of the reception window must be large enough with appropriate margins in order to avoid frame drops.

As a consequence of a large reception window, timing adjustment procedure for adapting to various delay conditions will be less sensitive. There will be more frames arriving within the reception window and as a result fewer timing adjustment control frames sent from the Node B's to the RNC, wherein transmission time adjustment of frames sent from the RNC to the Node B's is undertaken more seldom. Hence, data will be buffered for longer periods, which will increase the RTT. It should be noted that data frames are sent from the RNC such that they reach the reception window of the NodeB at an end point of the window in order to reduce buffering of data frames. Thus, when link delay increases, frames will arrive outside the reception window and timing adjustments are undertaken accordingly. However, if the delay decreases, data frames will arrive in the window but not at the end point. In case of a great decrease, the data frames will possibly arrive in the middle of the reception window. In this case, no timing adjustments will be undertaken, resulting in unnecessarily large delays in the communication link.

In the art, round trip delay between an RNC and Node B's participating in handover a mobile terminal is measured once and for all initially, and subsequently variations in delay on the communication links established between the RNC and the Node B's is adjusted either by controlling timing of the data transmissions from the RNC to the Node B's or, if the delay exceeds a Transmission Time Interval (TTI), by adjusting connection frame number (CFN) associated with radio frames sent between the RNC and the Node B's, or both.

SUMMARY

An object of the present invention is to solve, or at least mitigate, the problem of experiencing delay variations in communication links established between the RNC and the Node B's in a radio access network, and provide an improved method of adapting to the delay variations in and between communication links, as well as the provide an improved method of adapting to the delay variations between communication links at handover.

This object is attained in a first aspect of the present invention by a method of adapting to delay in a communication link established between a radio access network supervising entity and at least one radio base station communicating with a mobile terminal. The method comprises associating a target Connection Frame Number (CFN) to each transmitted data frame, which target CFN is calculated by offsetting an expected CFN with a counter value corresponding to a current communication link delay, and repeatedly determining delay of the communication link. Further, the method comprises adapting the delay of the communication link by adjusting transmission time of the transmitted frame and/or adjusting the target CFN of the transmitted frame, which target CFN is calculated by offsetting the expected CFN with a counter value corresponding to a determined new delay.

This object is attained in a second aspect of the present invention by a device for adapting to delay in a communication link established between the device and at least one radio base station communicating with a mobile terminal. The device comprises a processing unit being arranged to associate a target Connection Frame Number, CFN, to each transmitted data frame, said target CFN being calculated by offsetting an expected CFN with a counter value corresponding to a current communication link delay, repeatedly determine delay of the communication link, and adapt to the delay of the communication link by adjusting transmission time of the transmitted frame and/or adjusting the target CFN of the transmitted frame, said target CFN being calculated by offsetting the expected CFN with a counter value corresponding to a determined new delay.

Thus, the radio access network supervising entity, being e.g. an RNC, advantageously measures and determines the round trip delay of the respective link established between the RNC and the radio base station in the RAN, being e.g. a NodeB, repeatedly. This is performed by using available Node Synchronization control frame functionality used in 3GPP. From the round trip delay, the delay of each communication link can be calculated. Should the delay of the communication link vary, it will rapidly be adapted to.

This will be described in more detail in connection to a further embodiment where a plurality of NodeB's are involved in handover of a mobile terminal, where there is a difference in delay among the communication links established between the RNC and the NodeB's.

In this particular embodiment, delays in communication links established between a radio access network supervising entity and at least two radio base stations are adapted to when performing handover of a mobile terminal. Thus, the delay of each communication link is repeatedly determined and the communication link having the greatest delay is identified from the determined delay of each communication link, in case the greatest delay has changed. Moreover, the method comprises the steps of adapting the delay of the communication links such that the communication links having a delay smaller than the greatest delay is synchronized with the communication link having the greatest delay. The delay of the communication links is adapted to by adjusting transmission time of the transmitted frame; and/or adjusting the target CFN of the transmitted frame, which target CFN being calculated by offsetting the expected CFN with a counter value corresponding to the identified greatest delay.

Thus, the radio access network supervising entity, being e.g. an RNC, advantageously measures and determines the round trip delay of the respective link established between the RNC and the radio base stations in the RAN, being e.g. NodeB's, repeatedly. This is performed by using available Node Synchronization procedure as described in 3GPP TS 20.427 specification. From the round trip delay, the delay of each communication link can be determined. Should the delay of any one of the communication links vary, it will rapidly be adapted to that of the greatest delay, or if the greatest delay varies, the delays of the other communication links will be adjusted to the varying greatest delay.

Determination of round trip delay is generally undertaken by using sliding window averaging. For instance, a round trip delay value is sampled every 10 s, where one window is 10 samples, and an average of 100 windows are used for determining round trip delay. However, in highly dynamic environments, it may be necessary to sample more often.

In the art, timing adjustment is used to adapt to delay variation on established communication links. Due to the larger delay variation (for instance due to low-quality transport networks), the reception window of a particular NodeB must be increased. As a consequence of a large reception window, timing adjustment procedure for adapting to various delay conditions will be less sensitive. There will be more frames arriving within the reception window and as a result fewer timing adjustment control frames sent from the Node B's to the RNC, wherein transmission time adjustment of frames sent from the RNC to the Node B's is undertaken more seldom. Hence, data will be buffered for longer periods, which will increase the RTT.

With the present invention, the RNC will frequently and continuously monitor and determine RTT "in the background", i.e. while communication with the NodeB's are ongoing such that communication link delays can be adapted to. By doing this, the reception windows of the NodeB's can be shorted and the RTT can thus be decreased.

In an embodiment of the present invention, the delay of the communication link to be adapted is adapted by advancing the target CFN to reflect the identified greatest delay. Assuming that one or more NodeB's are participating in handing over a mobile terminal, and the target CFN has been set such that it reflects the current greatest delay of the communication links. The delay of each communication link is repeatedly determined by the RNC, and if a further NodeB having a greater delay is identified to participate in the handover of the mobile terminal. The delay of said one or more NodeB's must be adapted to that of the identified new NodeB, the communication link of which has the currently greatest delay. Thus, assuming that the previous greatest delay was e.g. toms and the new determined greatest delay is e.g. 80 ms, the target CFN must be advanced correspondingly. The duration of a CFN is 10 ms, meaning that an advancement corresponding to 60 ms (i.e. a target CFN increment of 6) must be effected. This will adapt the delay of the smaller-delay links to the that of the new participating link having the greatest delay, and synchronized data frames transmitted from the RNC via the NodeB's will be submitted over the air interface once the expected CFN reaches the same value as the target CFN was advanced to.

In another embodiment of the resent invention, with reference to the preceding embodiment, assuming that the further NodeB having a greater delay that is identified to participate in the handover of the mobile terminal has a delay which is within one TTI from the previously greatest delay. The delay of said one or more NodeB's must be adapted to that of the identified new NodeB, the communication link of which has the currently greatest delay. However, in this case, since a relatively small adjustment is to be made, the delay of the respective communication link to be adapted is adapted by advancing the transmission time of the transmitted frame to reflect the greatest delay.

In a further embodiment of the present invention, in case the NodeB having the communication link with the greatest delay is no longer to be involved in the handover of the mobile terminal, the delay of the respective communication link to be adapted is adapted by reducing the target CFN to reflect a greatest delay of a remaining communication link. In analogy with the previously described embodiment where the target CFN was advanced, if the NodeB having a link delay of 80 ms leaves the handover, the remaining greatest delay is toms, and must be adapted to accordingly, meaning that a reduction corresponding to 60 ms (i.e. a target CFN decrement of 6) must be effected. This will adapt the delay of the remaining communication links to that having the greatest delay.

With further reference to this embodiment, data frames received from core network may be buffered until the target CFN has reached a value exceeding the target CFN that was current at the point in time when the radio base station having the communication link with the greatest delay no longer was to be involved in the communication with the mobile terminal. Further advantageous is that the buffered data frames received from the core network may be discarded in case the data frames relate to speech data, thereby reducing the delay to the mobile terminal.

Its should be noted that RTT includes the delay associated with physical transmission characteristics of the communication link as well as delay caused by particular services that are used by the UEs, like TCP based applications or speech.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

Figure 1:
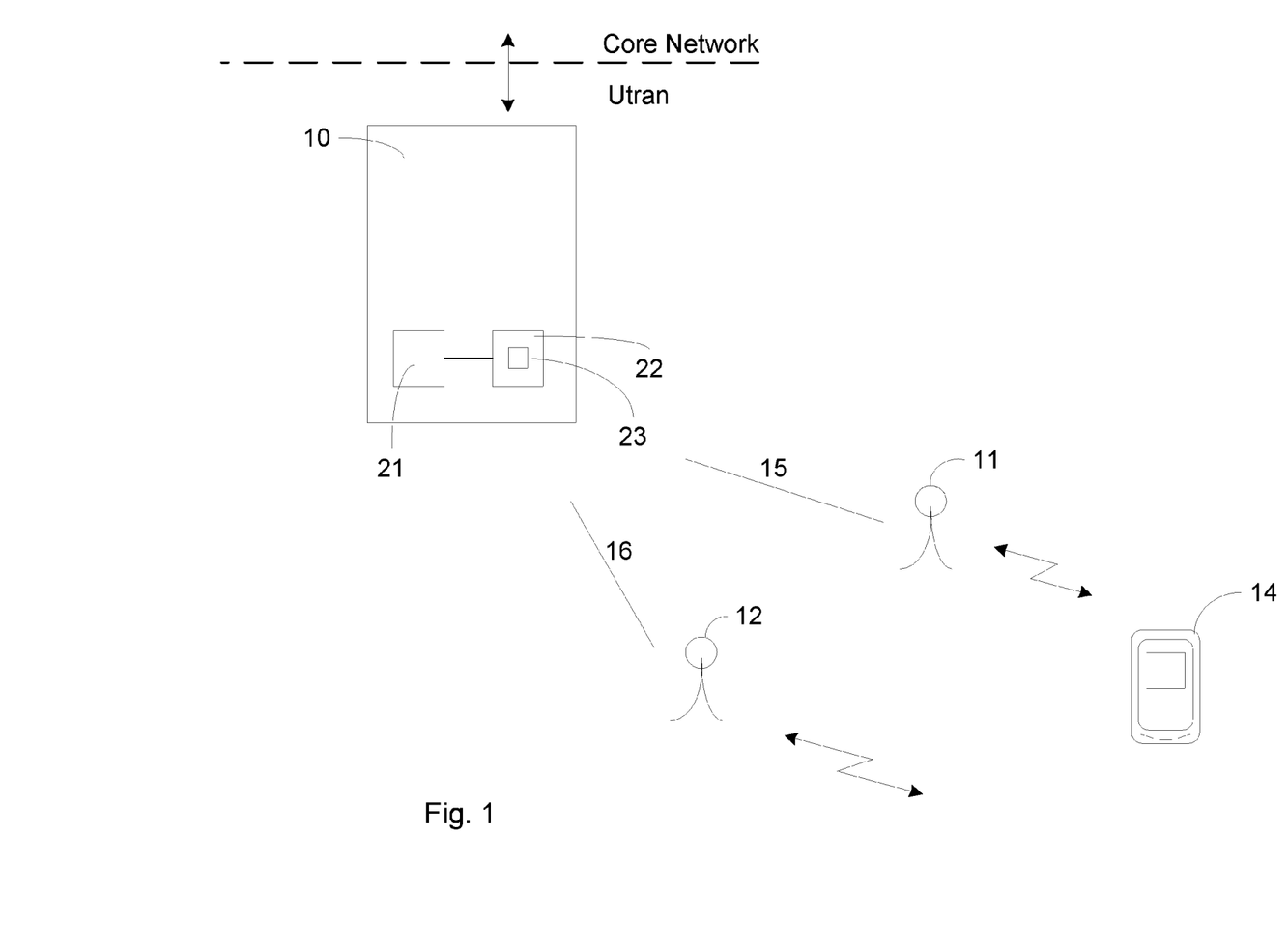
FIG. 1 illustrates a communications network in which the present invention may be implemented.

FIG. 1 illustrates a network of radio base stations 11, 12 in the following referred to as NodeB's, communicating with a supervising entity in the form of an RNC 10. One or more of the NodeB's may further communicate with one or more mobile terminals 14, also referred to as user equipment (UE), over an air interface. The network may comply with standards such as e.g. Long Term Evolution (LTE), Wideband Code Division Multiple Access (WCDMA), Code Division Multiple Access 2000 (CDMA2000), etc.

The RNC 10 along with the NodeB's 11, 12 make up the Universal Terrestrial Radio Access Network (UTRAN). This communications network is commonly referred to as 3G (3rd Generation Wireless Mobile Communication Technology), and facilitates connectivity between the mobile terminal(s) 14 and the core network. The network of FIG. 1 is an example of a network in which the present invention advantageously may be implemented. The method of adapting to delays in communication links according to embodiments of the present invention is undertaken at the RNC 10, and is in practice controlled by a processing unit 21 embodied in the form of one or more microprocessors arranged to execute a computer program 23 downloaded to a suitable storage medium 22 associated with the microprocessor, such as a Random Access Memory (RAM), a Flash memory or a hard disk drive. The processing unit 21 is arranged to at least partly carry out the method according to embodiments of the present invention when the appropriate computer program 23 comprising computer-executable instructions is downloaded to the storage medium 22 and executed by the processing unit 21. The storage medium 22 may also be a computer program product comprising the computer program 23. Alternatively, the computer program 23 may be transferred to the storage medium 22 by means of a suitable computer program product, such as a floppy disk or a memory stick. As a further alternative, the computer program 23 may be downloaded to the storage medium 22 over a network. The processing unit 21 may alternatively be embodied in the form of an application specific integrated circuit (ASIC), a field-programmable gate array (FPGA), a complex programmable logic device (CPLD), etc.

With reference to FIG. 1, in a first exemplifying embodiment, it is assumed that the RNC 10 communicates with a mobile terminal 14 via a first NodeB 11.

The communication link 15 established between the RNC and the first NodeB 11 has a delay of toms. Now, if a second NodeB 12 for example is to participate in handover the mobile terminal 14, a further communication link 16 having a delay of 80 ms must be considered. The TTI of the system is assumed to be toms. In order to have data to be communicated via the two NodeB's 11, 12 to the mobile terminal 14 arrive at (at least approximately) the same time, the delay of the communication link 15 of the first NodeB 11 must be adapted to the delay of the radio link 16 of the second NodeB 12.

This is generally undertaken at the RNC 10 by either advancing a target Connection Frame Number (CFN) associated with each transmitted data frame, or by adjusting transmission time of the transmitted frame, or both. The target CFN is based on expected CFN of the RNC 10 and the greatest communication link delay. The expected CFN is used for channel synchronisation between UE and UTRAN, and is specified e.g. in specification 3G TS 25.402. For smaller variations in delay (within a TTI), adjustment of transmission time will be used; hence, depending on the timing of arrival of a frame with respect to an end point of a reception window of a particular NodeB, the transmission time is adjusted in the RNC in the next TTI. For larger delay variations, the target CFN is adjusted.

Now, with respect to the above given exemplifying embodiment, the adaption of the delay of the communication link 15 of the first NodeB 11 to that of the communication link 16 of the second NodeB 12 will be illustrated with reference to FIG. 2. The data frames will be sent at the same time from the RNC to the NodeB's 11, 12 but will due to delay difference in communication links 15 and 16, respectively, arrive at different points in time at the NodeB's. Thus, the data frames received at the first NodeB 11 will have to be buffered until the second NodeB 12 has received the corresponding data frames and is ready to transmit the received data frames over the air interface to the mobile terminal 14.

Figure 2:
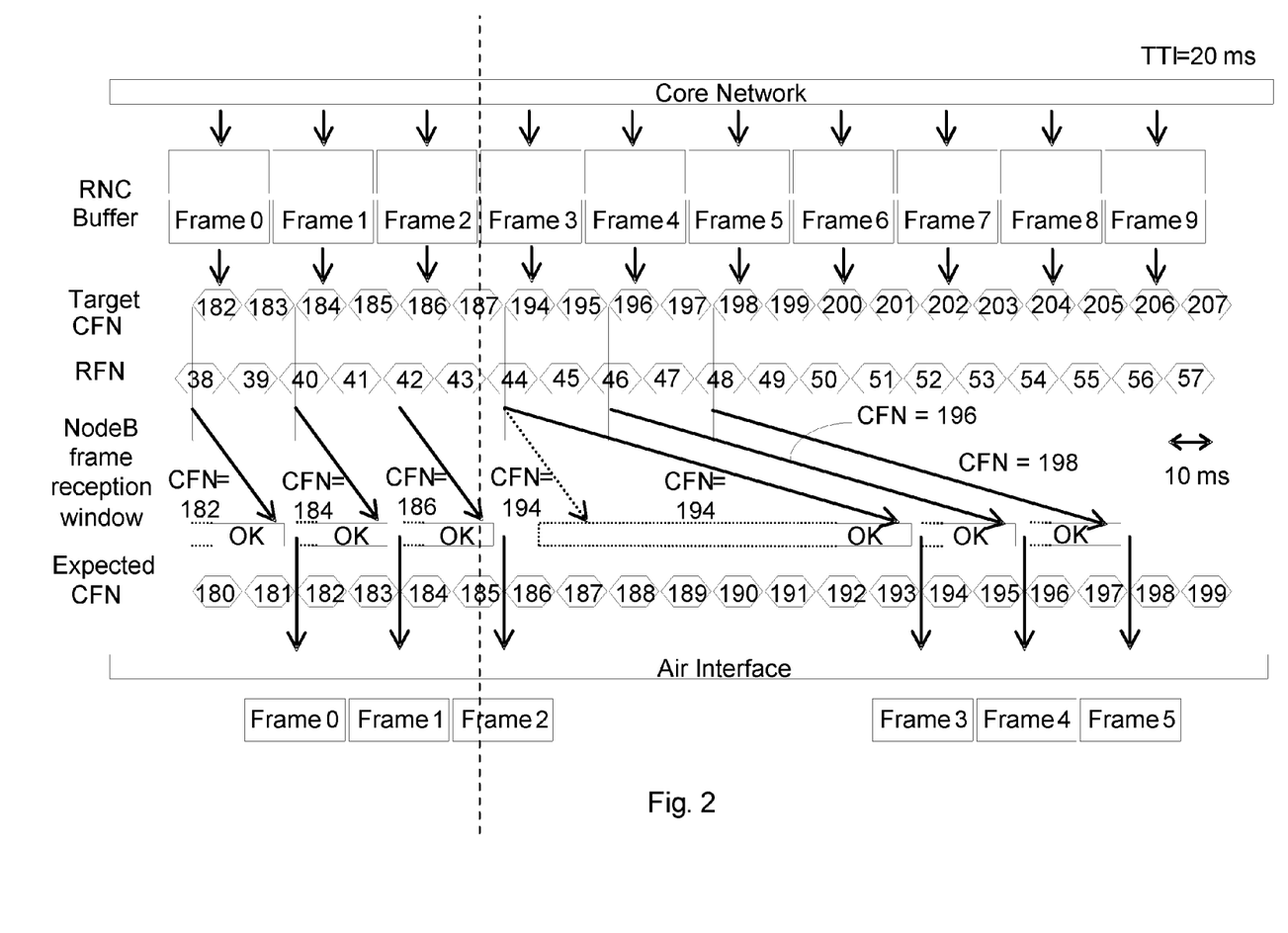
FIG. 2 shows a timing diagram illustrating an embodiment of the present invention.

Firstly, in FIG. 2, it can be seen that the RNC 10 associates the first data frame to be sent (Frame 0) with a target CFN=182 and transmits it on the communication link 15 at a given point in time T stipulated by the RNC frame number (RFN), i.e. RFN=38<T<39=RFN. One TTI after Frame 0 has been transmitted, the RNC transmits a next frame (Frame 1) and associates Frame 1 with the previous target CFN increased by two, i.e. target CFN=184. In case a timing adjustment control frame is received by the RNC 10 from the first NodeB 11, indicating that the previously received frame was received earlier or later than expected with respect to the NodeB reception window end point, the RNC 10 delays or advances transmission of the frame by a corresponding time period. Thereafter, the RNC proceeds with transmitting Frame 2 at RFN=42<T<43=RFN and increases the target CFN to 186. At the NodeB side, the respective Frame 0, 1, and 2 is received at the end point of the NodeB reception window, and the transmission of the respective data frame over the air interface is synchronized with expected CFN. Hence, in the case of the single link delay adaption undertaken in the above, the link delay is determined, and the delay is adapted to by adjusting target CFN (=182) in that the expected CFN (=180) is offset with a counter value (=2) corresponding to a current communication link delay being toms.

Then, is discussed with reference to FIG. 1, a communication link is established between the RNC 10 and the second NodeB 12, having a greater communication link delay (80 ms) than that (toms) of the first NodeB 11. The RNC 10 thus repeatedly determines the RTT, and identifies the link having the greatest delay. Now, in order to bring the two NodeB's 11, 12 into synchronization such that the delay of the communication link of the first NodeB 11 is adapted to that of the communication link of the second NodeB 12, the RNC 10 advances the target CFN in accordance with the determined RTT. In this particular example, a delay of toms should be adapted to a delay of 80 ms. Hence, the RNC 10 advances the target CFN from 188 to 194, which corresponds to a time period of 60 ms, i.e. to the greatest identified delay.

The dotted arrow at target CFN=194 indicates the first NodeB 11 receives Frame 3 in line with the reception timing of previous frames Frame 0, Frame 1 and Frame 2. However, the continuous arrow at CFN=194 indicates that the second NodeB 12 will receive Frame 3 at the end of its reception window 60 ms later than the first NodeB 11 due to the difference in delay between the two communication links, so the first NodeB 11 will have to wait for the reception window end point, where the second NodeB 12 receives Frame 3, until it transmits the received Frame 3 over the air interface. This is synchronized by the expected CFN reaching 194, wherein the first and second NodeB's are synchronized and can start transmission of Frame 3 over the air interface. Thus, the delay of the communication link 15 of the first NodeB 11 has advantageously been adapted to that of the communication link 16 of the second NodeB 12 by having the RNC 10 redetermine the RTT and advance the target CFN on the basis of the redetermined round trip delays.

Should a further NodeB participate in the communication with mobile terminal 14, which further NodeB has a communication link delay smaller than the greatest communication link delay which has been adapted to, the communication link of the further NodeB should be adapted to the current greatest delay but neither recalculation of target CFN nor adjustment of transmission time is performed, since the continuously determined WIT has not changed. This is also the case if any one of the NodeB's having a communication link delay smaller than the greatest communication link delay no longer is to participate in the communication with the mobile terminal 14.

Moreover, should a further NodeB participate in the communication with mobile terminal 14, which further NodeB has a communication link delay slightly greater (within a TTI) than the greatest communication link delay which has been adapted to, advancement of transmission time is performed for the remaining NodeB's.

Again with reference to FIG. 1, in a second exemplifying embodiment, it is assumed that the RNC 10 communicates with the mobile terminal 14 via the first and second NodeB's 11, 12, and that the delay of the communication link 15 of the first NodeB 11 has been adapted to that of the communication link of the second NodeB 12, as previously has been described with reference to FIG. 2. If the second NodeB 12 no longer is to participate in the communication with the mobile terminal 14, the first NodeB 11 will have the greatest communication link delay (and possibly further NodeB's are participating, the delay of which must be adapted to the of the first NodeB 11).

Figure 3:
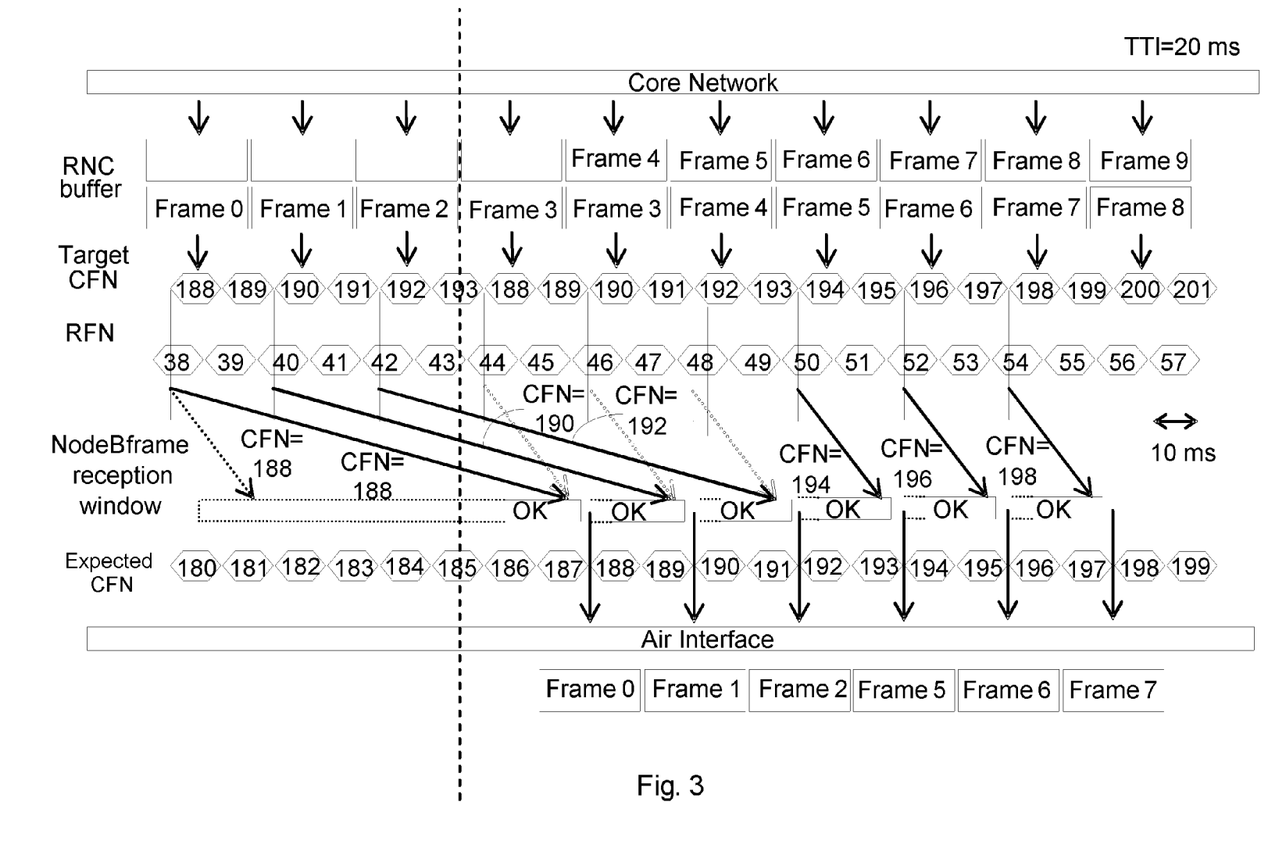
FIG. 3 shows a timing diagram illustrating a further embodiment of the present invention.

This second exemplifying embodiment will be described in more detail with reference to FIG. 3. Hence, at Frame 0 transmitted by the RNC 10 at RFN=38, the first and second NodeB's 11, 12 are synchronized and the relation of the target CFN (188) associated with the data frame with respect to the expected CFN (180) reflects the difference in delay that initially was present for the first and second communication link 15, 16. Since the first and second NodeB's 11, 12 are synchronized during the RNC 10 transmission of the three first data frames (Frame 0, 1 and 2), it can be deducted from FIG. 3 that a frame sent from the RNC reaches the air interface after 80 ms. The dotted arrow at CFN=188 indicates that the first NodeB 11 receives Frame 0 with a delay of 20 ms. However, the continuous arrow at CFN=188 indicates that the second NodeB 12 will receive Frame 0 at the end of its reception window 60 ms later than the first NodeB 11 due to the difference in delay between the two communication links, so the first NodeB 11 will have to wait for the reception window end point, where the second NodeB 12 receives Frame 0, until it transmits the received (and buffered) Frame 0 over the air interface. This is synchronized by the expected CFN reaching 188, wherein the first and second NodeB's are synchronized and can start transmission of Frame 0 over the air interface.

At RFN=44, the second NodeB 12 is removed and the RNC 10 which continuously determines the round trip delay of the respective communication link will take the new greatest delay into consideration for adjusting the target CFN. Thus, in view of the redetermined round trip delay, the target CFN will be reduced from 194 to 188. As can be seen in FIG. 3, for the target CFN's associated with the data frames, the transmission of data frames will be postponed for target CFN's already used, i.e. until the target CFN has reached 194. In case the data frames relate to data traffic, the RNC 10 will buffer the data frame received from the core network while the target CFN still has not reached values not previously used.

However, in case the data frames relate to speech traffic, the RNC 10 will drop the two buffered frames (Frame 3 and Frame 4), and when the target CFN reaches 194, Frame 5 will be transmitted by the RNC 10 and reach the first NodeB 11 about 20 ms later. Advantageously, any delay of a NodeB participating in the communication with the mobile terminal 14 has been adapted to that of the communication link 15 of the first NodeB 11, being the NodeB having the greatest delay after the second NodeB 12 was removed. Further, advantageous is that by dropping the buffered Frames 3 and 4, the round trip delay has advantageously been reduced. As can be seen the data frames are transmitted over the air interface when the expected CFN corresponds to target CFN associated with the frames when they were transmitted from the RNC 10.

Again with reference to FIG. 2, an exemplifying embodiment of the second aspect is described. In this exemplifying embodiment, it is assumed that the delay of the communication link of the single NodeB 11 communicating with the RNC suddenly decreases from 80 ms to 20 ms. Hence, at Frame 0 transmitted by the RNC 10 at RFN=38, the first delay of the link of the first NodeB 11, is 80 ms reflected by the relation of the target CFN (188) associated with the data frame with respect to the expected CFN (180). This delay remains for the three first data frames (Frame 0, 1 and 2), it can be deducted from FIG. 3 that a frame sent from the RNC reaches the air interface after 80 ms.

At RFN=44, the delay changes which is detected by the RNC 10 which continuously determines the round trip delay of the communication link. This new delay is taken into consideration for adjusting the target CFN. Thus, in view of the redetermined round trip delay, the target CFN will be reduced from 194 to 188. As can be seen in FIG. 3, for the target CFN's associated with the data frames, the transmission of data frames will be postponed for target CFN's already used, i.e. until the target CFN has reached 194. In case the data frames relate to data traffic, the RNC 10 will buffer the data frame received from the core network while the target CFN still has not reached values not previously used.

However, in case the data frames relate to speech traffic, the RNC 10 will drop the two buffered frames (Frame 3 and Frame 4), and when the target CFN reaches 194, Frame 5 will be transmitted by the RNC 10 and reach the first NodeB 11 about 20 ms later. It should be noted that in this particular exemplifying embodiment, the buffer for speech traffic is two frames, but other buffer sizes are envisaged. Advantageously, the new delay has been adapted to. Further, advantageous is that by dropping the buffered Frames 3 and 4, the round trip delay has advantageously been reduced. As can be seen the data frames are transmitted over the air interface when the expected CFN corresponds to target CFN associated with the frames when they were transmitted from the RNC 10.

Figure 4:
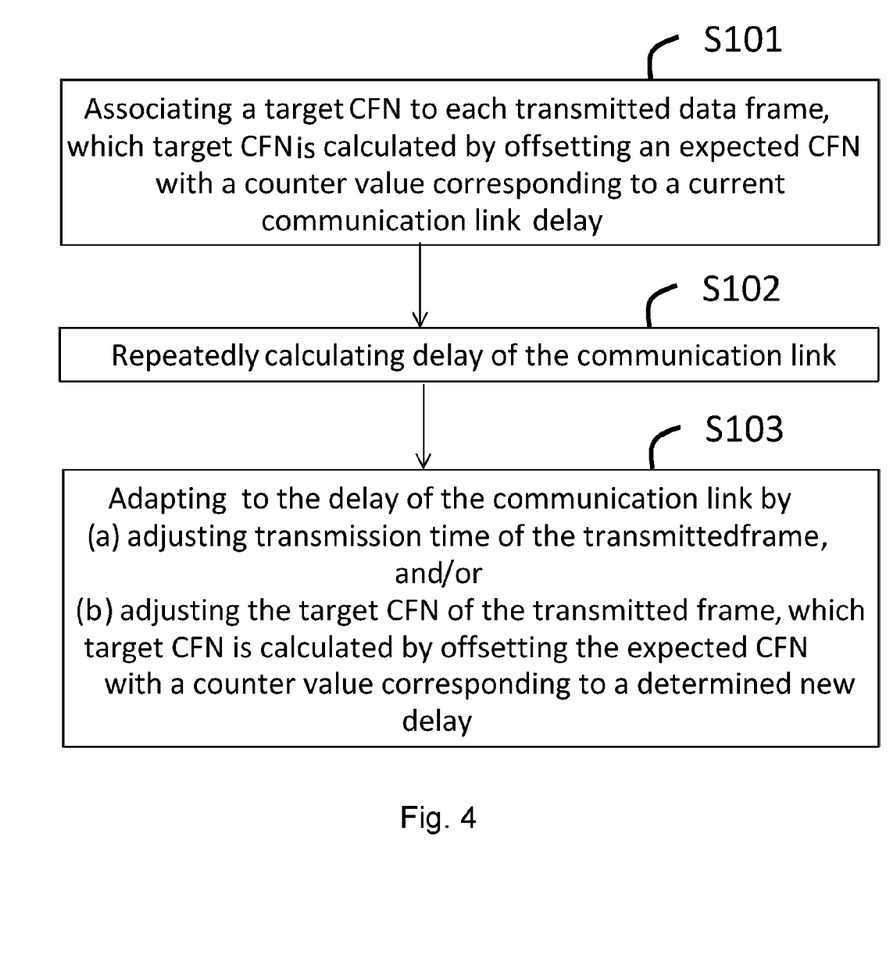
FIG. 4 shows a flowchart illustrating the method of adapting to delay in a single communication link according to an embodiment of the present invention.
Figure 5:
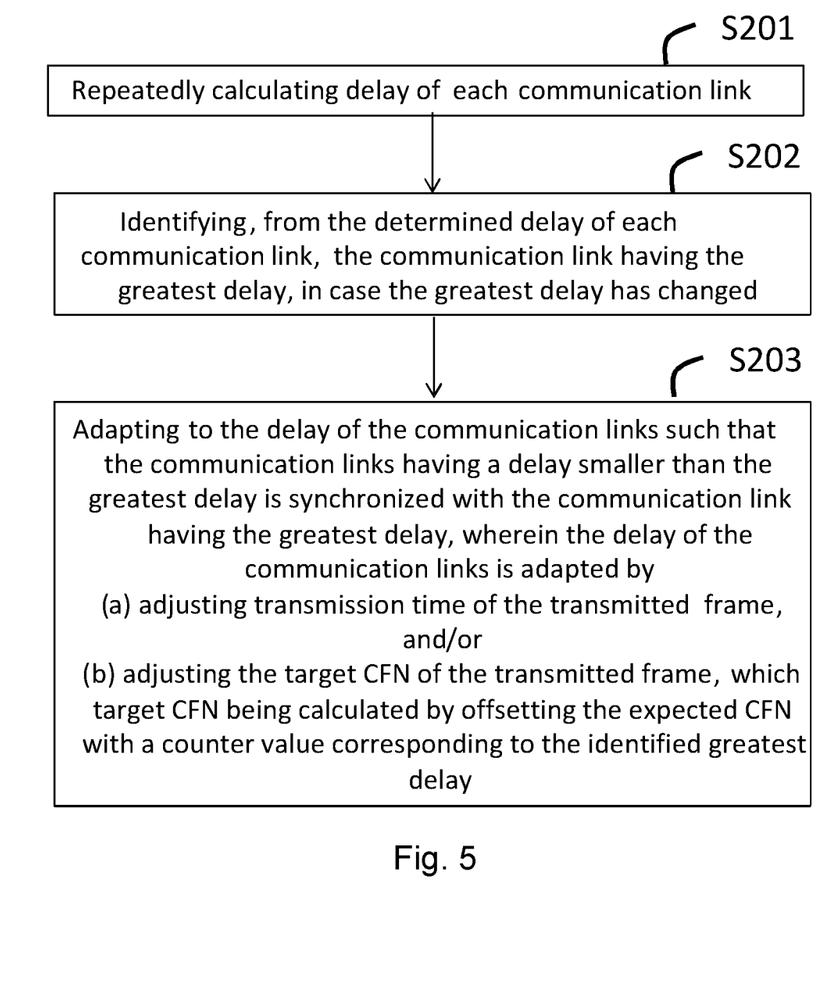
FIG. 5 shows a flowchart illustrating the method of adapting to delay differences between a plurality of communication links according to a further embodiment of the present invention.

FIG. 4 shows a flowchart illustrating the method of adapting to delay in the communication link 15 established between the RNC 10 and the first NodeB 11 communicating with the mobile terminal 14 in accordance with an embodiment of the present invention, as has been described with reference to FIG. 2. In a first step S101, a target CFN is associated to each transmitted data frame, which target CFN (being 182 in the example of FIG. 2) is calculated by offsetting an expected CFN (180) with a counter value (2) corresponding to a current communication link delay (i.e. 20 ms). In a second step S102, the communication link delay is repeatedly monitored and determined. Subsequently, in step S103, a change in delay in the link 15 is adapted to by adjusting transmission time of the transmitted frame and/or adjusting the target CFN of the transmitted frame, which target CFN is calculated by offsetting the expected CFN with a counter value corresponding to a determined new delay Again with reference to FIG. 2, no change in delay occurs until the second NodeB 12 participates in the communication, so no adjustment of the target CFN is undertaken. However, assuming for example that the delay in the single communication link 15 would increase from the current toms to, say, 40 ms, then the new delay would be monitored and the target CFN would be advanced corresponding to another toms, i.e. the target CFN would be advanced another 2 units. FIG. 5 shows a flowchart illustrating the method of adapting to differences in delay in the communication links 15, 16 established between the RNC 10 and the first and second NodeB 11,12, respectively, communicating with the mobile terminal 14 for performing handover in accordance with an embodiment of the present invention, as has been described with reference to FIG. 2. Hence, this flowchart illustrates the procedure occurring from Frame 3 and on, when the second NodeB 12 starts participating in the communication with the mobile terminal 14. In a first step S201, delay is determined for each communication link 15, 16. In a second step S202, the communication link 16 having the greatest delay is identified from the determined delay of each communication link 15, 16, in case the greatest delay has changed. This delay is adapted to in step S203 by advancing the target CFN another 6 units (from 188 to 194 in the example of FIG. 2).

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method at a radio access network supervising entity, of adapting to delay in a communication link established between the radio access network supervising entity and at least one radio base station communicating with a mobile terminal, the method comprising:
    associating a target Connection Frame Number (CFN) to each transmitted data frame, said target CFN being calculated by offsetting an expected CFN with a counter value corresponding to a current communication link delay associated with a first communication link between the radio access network supervising entity and a first radio base station communicating with the mobile terminal;
    determining delay of the first communication link;
    adapting to the delay of the first communication link by adjusting transmission time of the transmitted data frame or adjusting the target CFN of the transmitted data frame, said target CFN being calculated by offsetting the expected CFN with a counter value corresponding to the determined delay;
    establishing a second communication link between the radio access network supervising entity and a second radio base station;
    determining delay for each of the first and second communication links;
    identifying a greatest delay from the determining of the delay of each of the first and second communication links; and
    adapting delay of each of the first and second communication links by advancing the transmission time of the transmitted data frame to reflect the greatest delay or by advancing the target CFN to reflect the greatest delay.

2. The method of claim 1, wherein the second communication link is established between the radio access network supervising entity and the second radio base station for performing handover of the mobile terminal.

3. The method of claim 1, wherein transmission of a particular data frame over radio base station air interface is enabled when the expected CFN equals a target CFN associated with said particular data frame.

4. The method of claim 2, wherein the delay of each communication link is adapted by advancing the transmission time of the transmitted data frame to reflect the greatest delay, if a difference between the greatest delay and the delay of the communication link to be adapted is less than a Transmission Time Interval (TTL).

5. The method according to claim 2, wherein, in case one of the radio base stations having the communication link with the greatest delay is no longer to be involved in the handover of the mobile terminal, the delay to be adapted is adapted by reducing the target CFN to reflect a greatest delay of a remaining communication link.

6. The method according to claim 5, further comprising:
    buffering data frames received from a core network until the target CFN has reached a value exceeding a target CFN that was current at a point in time when the radio base station having the communication link with the greatest delay no longer was to be involved in the handover of the mobile terminal.

7. The method according to claim 6, further comprising:
    discarding the buffered data frames received from the core network in case the data frames relate to speech data.

8. A device configured to be a radio access network supervising entity, for adapting to delay in a communication link established between the device and at least one radio base station communicating with a mobile terminal, the device comprising a processing unit being arranged to:
- associate a target Connection Frame Number (CFN) to each transmitted data frame, said target CFN being calculated by offsetting an expected CFN with a counter value corresponding to a current communication link delay associated with a first communication link between the device and a first radio base station communicating with the mobile terminal;
- determine delay of the first communication link;
- adapt to the delay of the first communication link by adjusting transmission time of the transmitted data frame or adjusting the target CFN of the transmitted data frame, said target CFN being calculated by offsetting the expected CFN with a counter value corresponding to the determined delay
- establish a second communication link between the device and a second radio base station;
- determine delay for each of the first and second communication links;
- identify a greatest delay from determining of the delay of each of the first and second communication links; and
- adapt delay of each of the first and second communication links by advancing the transmission time of the transmitted data frame to reflect the greatest delay or by advancing the target CFN to reflect the greatest delay.

9. The device of claim 8, wherein the second communication link is established between the device and the second radio base station for performing handover of the mobile terminal.

10. The device of claim 8, wherein transmission of a particular data frame over radio base station air interface is enabled when the expected CFN equals a target CFN associated with said particular data frame.

11. The device of claim 9, wherein the delay of each communication link is adapted by advancing the transmission time of the transmitted data frame to reflect the greatest delay, if a difference between the greatest delay and the delay of the communication link to be adapted is less than a Transmission Time Interval (TTL).

12. The device according to claim 9, wherein, in case one of the radio base stations having the communication link with the greatest delay is no longer to be involved in the handover of the mobile terminal, the delay to be adapted is adapted by reducing the target CFN to reflect a greatest delay of a remaining communication link.

13. The device according to claim 12, wherein the processing unit is further being arranged to:
- buffer data frames received from a core network until the target CFN has reached a value exceeding a target CFN that was current at a point in time when the radio base station having the communication link with the greatest delay no longer was to be involved in the handover of the mobile terminal.

14. The device according to claim 13, wherein the processing unit is further being arranged to:
- discard the buffered data frames received from the core network in case the data frames relate to speech data.

15. The device according to claim 8, wherein said device is a radio network controller (RNC).

16. A non-transitory machine-readable storage medium having computer code stored therein, which when executed by a set of one or more processors of a device configured to be a radio access network supervising entity, for adapting to delay in a communication link established between the device and at least one radio base station communicating with a mobile terminal, causes the device to perform operations comprising:
- associating a target Connection Frame Number (CFN) to each transmitted data frame, said target CFN being calculated by offsetting an expected CFN with a counter value corresponding to a current communication link delay associated with a first communication link between the radio access network supervising entity and a first radio base station communicating with the mobile terminal;
- determining delay of the first communication link;
- adapting to the delay of the first communication link by adjusting transmission time of the transmitted data frame or adjusting the target CFN of the transmitted data frame, said target CFN being calculated by offsetting the expected CFN with a counter value corresponding to the determined delay;
- establishing a second communication link between the radio access network supervising entity and a second radio base station;
- determining delay for each of the first and second communication links;
- identifying a greatest delay from the determining of the delay of each of the first and second communication links; and
- adapting delay of each of the first and second communication links by advancing the transmission time of the transmitted data frame to reflect the greatest delay or by advancing the target CFN to reflect the greatest delay.

* * * * *